(12) United States Patent
Celik

(10) Patent No.: US 10,574,696 B2
(45) Date of Patent: Feb. 25, 2020

(54) SYSTEM AND METHOD FOR DETECTING PHISHING E-MAILS

(71) Applicant: Mucteba Celik, Jersey City, NJ (US)

(72) Inventor: Mucteba Celik, Jersey City, NJ (US)

(73) Assignee: Revbits, LLC, Melville, NY (US)

( * ) Notice: Subject to any disclaimer, the term of this patent is extended or adjusted under 35 U.S.C. 154(b) by 209 days.

(21) Appl. No.: 15/699,565

(22) Filed: Sep. 8, 2017

(65) Prior Publication Data

US 2019/0028510 A1   Jan. 24, 2019

Related U.S. Application Data

(60) Provisional application No. 62/533,782, filed on Jul. 18, 2017.

(51) Int. Cl.
*H04L 29/06* (2006.01)
*H04L 12/58* (2006.01)

(52) U.S. Cl.
CPC ........ *H04L 63/1483* (2013.01); *H04L 51/046* (2013.01); *H04L 51/12* (2013.01); *H04L 63/1416* (2013.01); *H04L 51/22* (2013.01); *H04L 51/24* (2013.01)

(58) Field of Classification Search
None
See application file for complete search history.

(56) References Cited

U.S. PATENT DOCUMENTS

| | | | | |
|---|---|---|---|---|
| 7,958,555 B1 * | 6/2011 | Chen | ............ | G06F 21/554 726/22 |
| 8,042,181 B2 * | 10/2011 | Judge | ............ | G06F 21/554 707/781 |
| 8,607,361 B2 * | 12/2013 | Gillum | ............ | H04L 63/126 709/206 |
| 8,839,369 B1 * | 9/2014 | Dai | ............ | H04L 63/10 713/178 |
| 9,497,218 B1 * | 11/2016 | Davydov | ............ | G06F 21/562 |
| 9,749,360 B1 * | 8/2017 | Irimie | ............ | H04L 63/1483 |
| 2006/0101334 A1 * | 5/2006 | Liao | ............ | G06F 17/2264 715/205 |
| 2006/0168066 A1 * | 7/2006 | Helsper | ............ | G06Q 10/107 709/206 |
| 2008/0244070 A1 * | 10/2008 | Kita | ............ | G06Q 10/00 709/225 |
| 2009/0006532 A1 * | 1/2009 | Sinn | ............ | H04L 51/12 709/203 |
| 2010/0125912 A1 * | 5/2010 | Greenshpon | ............ | G06F 21/577 726/25 |
| 2012/0166458 A1 * | 6/2012 | Laudanski | ............ | H04L 51/12 707/755 |
| 2012/0167174 A1 * | 6/2012 | Saxena | ............ | G06F 21/645 726/3 |

(Continued)

*Primary Examiner* — Maung T Lwin
*Assistant Examiner* — Olanrewaju J Bucknor
(74) *Attorney, Agent, or Firm* — Mandelbaum Slifin Economou LLP

(57) ABSTRACT

An application or a plugin to Email client application such as Outlook or Thunderbird is described which automatically analyzes and detects Phishing emails. The application reads emails in an email client that an end user is using to access his/her emails. The application views source code of the email with all email headers, analyzes signatures, SMTP logs, and all traces of email origin.

14 Claims, 3 Drawing Sheets

(56) References Cited

U.S. PATENT DOCUMENTS

| | | | |
|---|---|---|---|
| 2015/0365369 A1* | 12/2015 | Tokuda | H04L 51/14 |
| | | | 715/752 |
| 2016/0014151 A1* | 1/2016 | Prakash | H04L 63/1483 |
| | | | 726/22 |
| 2017/0223034 A1* | 8/2017 | Singh | H04L 43/062 |
| 2017/0223046 A1* | 8/2017 | Singh | H04L 43/062 |
| 2017/0324767 A1* | 11/2017 | Srivastava | H04L 51/12 |
| 2018/0375877 A1* | 12/2018 | Jakobsson | G06F 21/554 |
| 2019/0020682 A1* | 1/2019 | Edwards | H04L 51/12 |

* cited by examiner

FIG. 2

SYSTEM AND METHOD FOR DETECTING PHISHING E-MAILS

CROSS-REFERENCE TO RELATED APPLICATION

This application claims the benefit of priority of U.S. provisional application No. 62/533,782, filed Jul. 18, 2017, the contents of which are herein incorporated by reference.

BACKGROUND OF THE INVENTION

The present invention relates to network and computer security, and more particularly to network and computer security exploitation through phishing.

Today, one of the biggest corporate security problem is phishing emails. Security minded people can detect and distinguish phishing and legitimate emails. But regular employees and people who their job is not anyway related to security are unable to readily detect phishing emails. Consequently, the individuals reply to phishing emails and expose the network and computers to exploitation, causing many problems for individuals, companies and corporations.

Teaching employees about security and phishing and training them is never enough. Statistics show that still employees fall for a bit more advanced phishing emails.

As can be seen, there is a need for an application or a plugin that uses sophisticated analysis engine and algorithms and detects many abnormalities associated with phishing in emails and will warn user accordingly.

BRIEF DESCRIPTION OF THE DRAWINGS

FIG. 2 is a representative user interface illustrating aspects of the invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
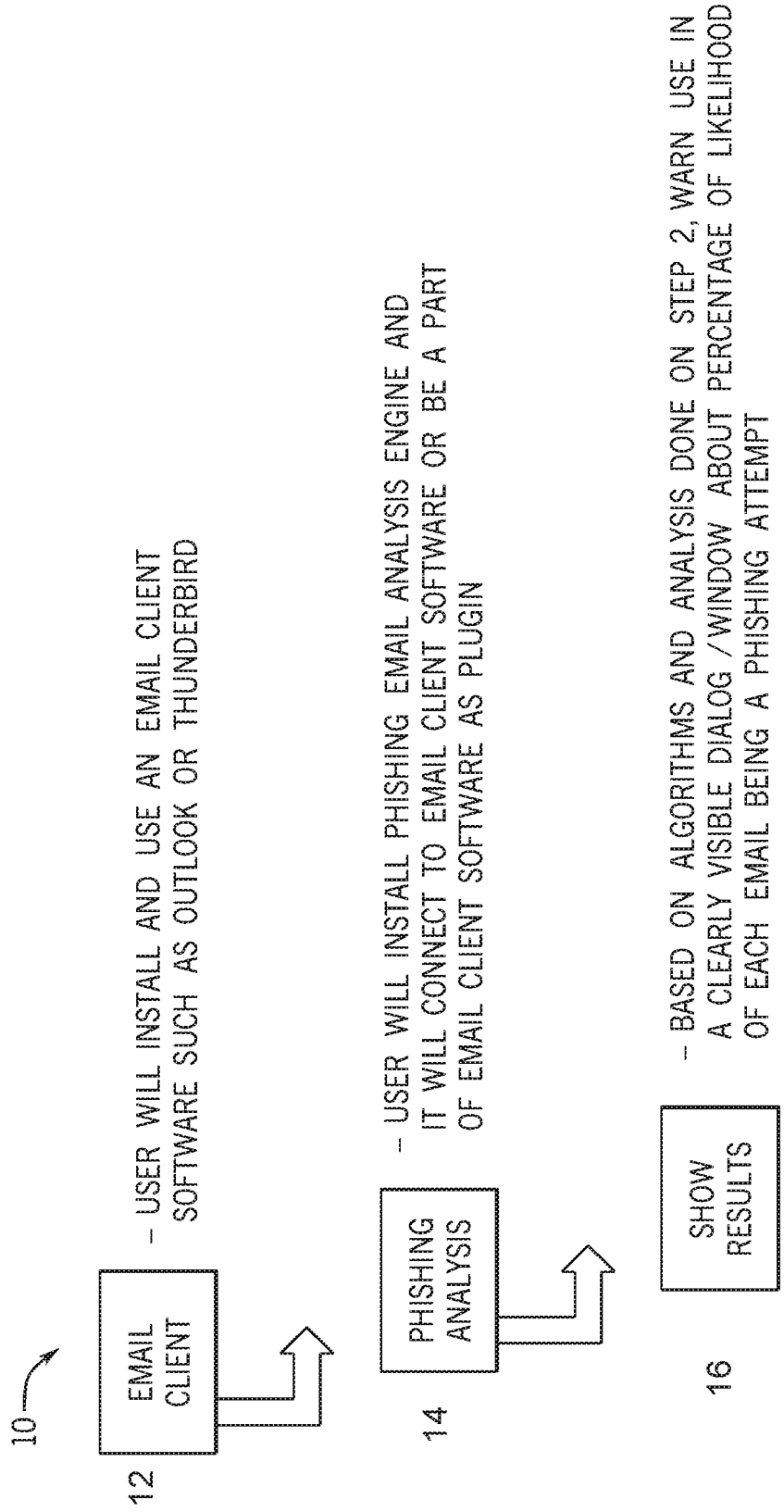
FIG. 1 is a representative flow chart illustrating aspects of the invention.

Broadly, embodiments of the present invention provides an application for automatically identifying phishing e-mails and alerting the user of the same. As shown in the flow diagram 10 in FIG. 1, the application may be implemented as a plugin that is installed (step 14) for various e-mail clients (installed at step 12), such as Microsoft Outlook, or Mozilla's Thunderbird. By leveraging a plurality of algorithms and phishing alert criteria the application can detect and mark suspicious and phishing emails on the fly with no visible effect on the user's e-mail client performance. The plugin uses a sophisticated analysis engine and algorithms and detect many abnormalities in emails and will warn user accordingly. The application is configured so that the user will have a visible and distinguishable window 22 (FIG. 2) appearing on their screen while viewing and reading emails. This window 22 is configured to alert the user (step 16) about likelihood of the email being phishing by a graph or meter or other ways that user can easily see and understand the risk.

The plugin/application 34 (shown in FIG. 3) detects malicious and phishing emails with a plurality of algorithm and tests performed on the e-mails received to identify one or more phishing indicators. By way of non-limiting example, these phishing indicators may include a selection of the following:

Analysis of the E-mail sender's IP location.

Where the sender uses a server with an IP location, and a company or person has no business ties or other relationship with a designated country associated with the IP address, indicates ties that are more susceptible for being a location of origin and a source of phishing. Since the person or company doesn't have ties or a relationship to that country (e.g. Russia, China, and the like), the system raises a threat level for the e-mail.

Email Sender's Email Domain (Many Checks on the Domain Itself, Including "Who Is").

The application 34 may be configured to run a full who is check on each email and check when the domain is registered. Since most phishing domains of origin are registered within 6 month of registration or transfer of domain ownership, this intelligence may be fed to the analysis engine and if the domain of origin is new, or recently transferred, the threat level will be increased.

Checking Sender's IP, domain, email address reputation and history.

Using threat intelligence application 34 checks ALL URLs in the email, their IP address history, their hostname history and if the IP has ever been marked for being source of phishing or spamming campaign.

Keywords used in the email.

For example phishing emails are usually referring to end user with general terms such as "Dear User" and "Hello" without naming the person. Application 34 increases the phishing analysis results by some points if general terms are found in the email such as "Dear User" instead of "Dear Mike".

Spelling Errors, Improper Capitalization, Extra Spacing Between Letters.

Since phishing emails tend to have more spelling errors. The application 34 may increase the threat level if it finds many errors exceeding one of a predetermined value or a selectable threshold value.

Use of URL Shorteners.

Usually phishing campaigns try to hide or conceal the real URL in their phishing link by using URL shorteners. The application 34 may be configured to not only detect the URL shorteners, it may also be configured to unmask the URL behind URL shortener. The unmasked URL information may then be sent for domain analysis, whois information, IP reputation and hostname reputation analysis and updating on the fly.

Multiple Redirections in URLs Contained or Embedded in the Email.

Phishing campaigns to throw off the security tools and analysis tools, use many redirections to hide their final destination and URL. The application 34 is configured to go layer after layer to find the final URL destination and analyze all the hosts in between.

Attachments with password where password is in same email.

The application 34 may also be configured to extract the password automatically in the email and decrypt the ZIP file in attachment. MS Office documents with a Macros or embedded OLE as an attachment.

The application 34 may also be configured go through an analysis of all attached files in email and automatically analyze them for usage of cryptography, macros, and other suspicious code items.

DomainKeys Identified Mail (DKIM) signature verification.

Addressing user with generic greetings. "Dear sir . . . " etc. for example instead of the recipient's real name.

Reply-To Path being different domain than the original senders address' domain.

The application 34 may be configured to run with thirty or more threads per email entry and is capable of almost instantaneously analyzing the email with separate threads. The application 34 makes a determination to tag a suspect e-mail and shows the percentage of likelihood of the email being a phishing attempt in order to alert the user of its suspect nature. The user may then utilize independent measures to confirm whether the e-mail is a phishing attempt, which may then be tagged for subsequent reporting if confirmed.

Based on the foregoing, a method of implementing the application 34 may be performed according to the following process flow:

A user receives an e-mail that is selected by the user for viewing within the e-mail client.

The plugin 34 creates a plurality of threads corresponding to one or more phishing indicators to instantly analyze the selected e-mail for a determination of whether the selected e-mail it is a phishing attempt. The application 34 is configured so that the threat intelligence feeds and other feeds included in the system are updated from a server 32 so that they are already cached in the client side so tests and analysis will run very quickly. Other aspects will retrieve information from one or more servers 32 that are updated on an ongoing basis.

The application 34 analysis engine makes the determination that an e-mail is a suspicious phishing attempt based on the detection of one or more phishing indicators and at block 16 shows the statistics and results in a very clearly visible way to the user of the e-mail client and warns the user that the suspect emails may be a phishing attempt.

Figure 2:
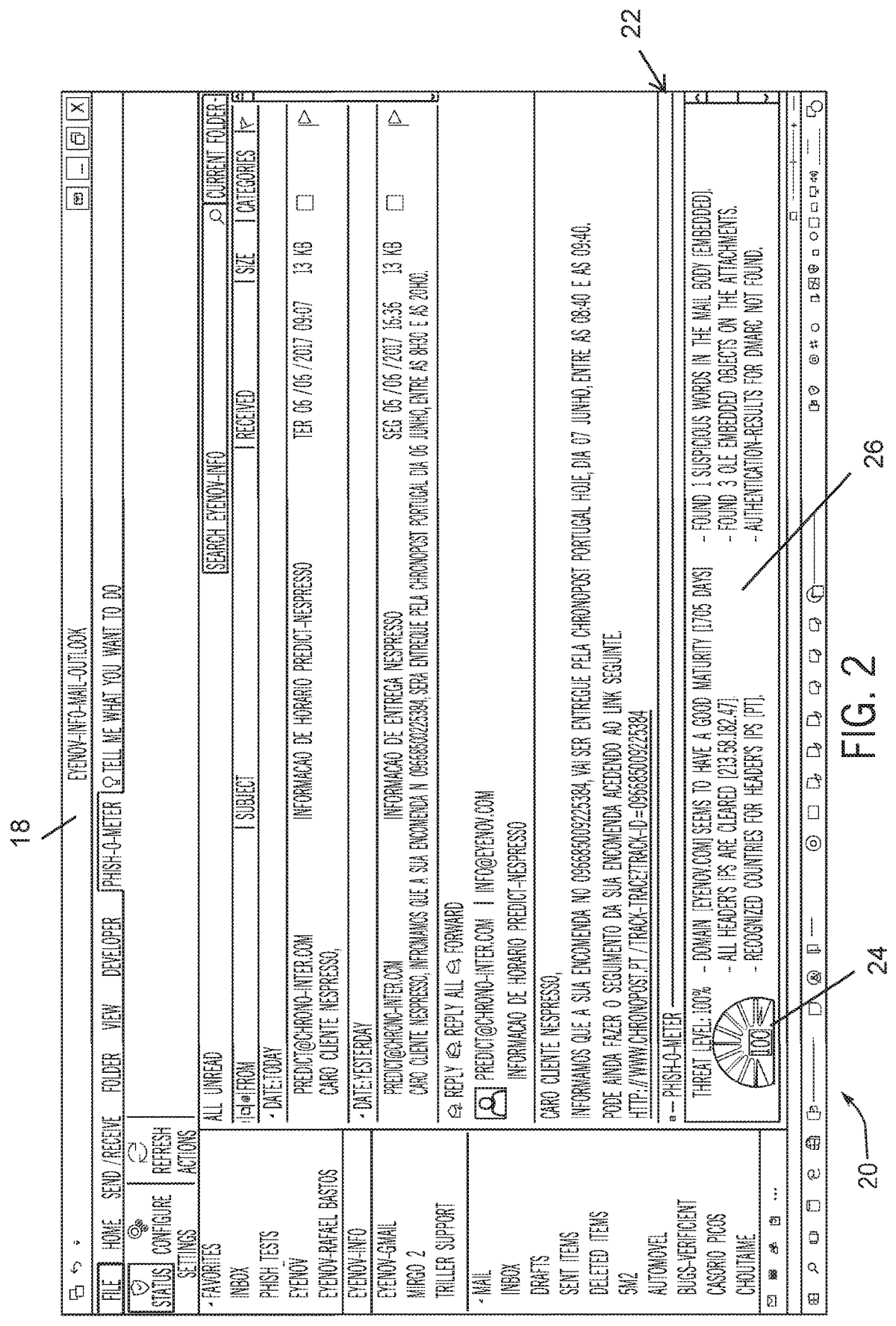

As seen in reference to FIG. 2, the user interface 20 of e-mail client 18 may present a phish-o-meter panel 22 or window over each e-mail when the user is viewing/reading the email in their e-mail client 18. That panel 22 or window will show the user information about the analysis results of the one or more detected phishing indicators that may be present within the currently viewed email. The system may also be configured to present a percentage of possibility 24, including a graphical display of a phish-o-meter 24, that presents a probability that the current email is a phishing attempt. This allows the user to identify and report suspicious emails for further analysis to system administrator.

The user interface 20, may also present a textual description of the one or more detected phishing indicators 26 that are contained within the presently viewed e-mail. The textual description of the one or more detected phishing indicators 26 allows the user to make an informed assessment of the viewed e-mail for reporting and analysis to the system administrator.

As will be appreciated, many customization or configuration parameters are available per corporate environment and per company. These parameters can be easily configured via a settings panel of the application 34. Such as suspicious keywords, suspicious "email from" countries, suspicious IP addresses, suspicious attachments, etc. The application 34 will go through all attached files in email and automatically analyze them for usage of cryptography, macros, and other suspicious items. If the email's possibility of being phishing is higher than certain percent (which is configurable by each network admin) links in the email will be automatically disabled.

Figure 3:
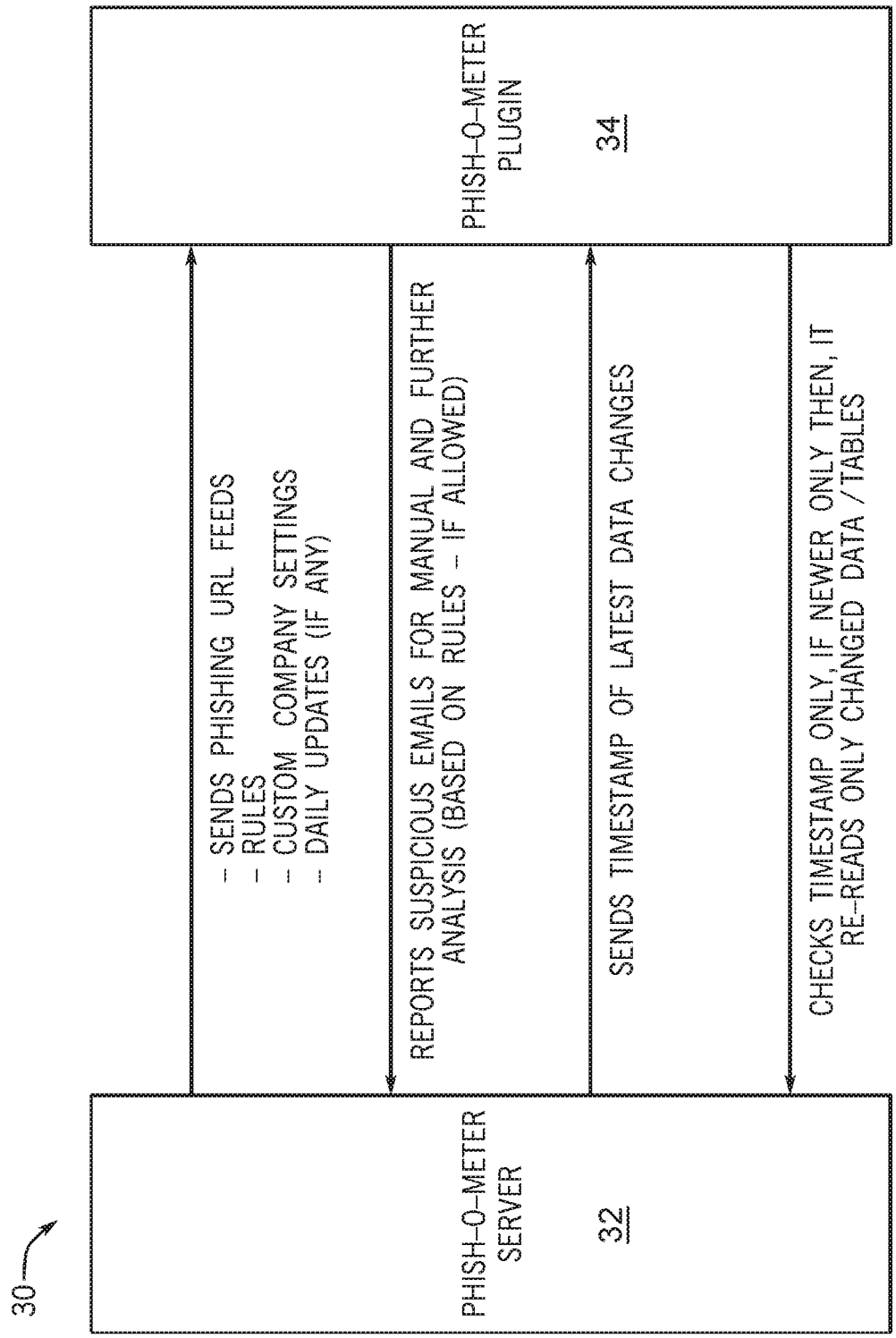
FIG. 3 is a representative data flow between a server and a plugin according to aspects of the invention.

As shown in the data flow diagram 30 in FIG. 3, application 34 may communicate with one or more servers 32. The servers 32 are configured to communicate with a plurality of threat intelligence data feeds that provide periodic or continuous data updates to one or more of the plurality of phishing indicators hosted by the server 32. The data updates are identified with a timestamp to reflect the currency of the data updates. The phishing detection application 34 may be configured to check the timestamp of the local phishing indicators against the timestamp of the phishing indicators hosted by the server 32. If the timestamp of the server 32 is newer than the timestamp of the local application 34, the application 34 updates the data for the local phishing indicators. To facilitate processing the updates are configured to retrieve only the newly updated data. The update check may be triggered by activation of the phishing detection application 34 or by the passage of a configurable update time parameter.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application 34 on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method for detecting and notifying a user of an e-mail client application of a phishing attempt presented by an e-mail viewed in the e-mail client application, comprising:
   loading a phishing detection application upon activation of the e-mail client application, the phishing detection application comprising a plugin to the e-mail client application;
   initiating an analysis engine that is part of the phishing detection application and which comprises a plurality of threads, wherein each thread is configured to analyze an e-mail, only within the e-mail client application, according to one of a plurality of phishing indicators;
   analyzing by the analysis engine a user selected e-mail from one or more e-mails displayed in the e-mail client application by running each of the plurality of threads on the user selected e-mail only within the e-mail client application; and
   presenting a result summary of the analysis engine in a panel of the e-mail client application.

2. The method of claim 1, wherein the plurality of phishing indicators comprises:
   an IP location of a sender of the e-mail;
   a domain of the sender;
   a registration date of the domain;
   a reputation history of the sender;
   one or more keywords contained in the e-mail;
   a URL shortener;
   a URL redirection;
   a DKIM header mismatch;
   an attachment with embedded malware; a password protected attachment;
   a heavily obfuscated java script in a URL; and
   a reply to path disparity.

3. The method of claim 2, wherein the results summary comprises a graphical presentation of a phishing meter within the panel.

4. The method of claim 3, wherein the results summary further comprises a textual description of one or more detected phishing indicators contained within the selected e-mail.

5. The method of claim 4, further comprising:
   updating the analysis engine according to data received via a threat intelligence feed, wherein the data is stored.

6. A computer-readable memory adapted for use by a user of an e-mail client application to detect a phishing e-mail received by the user in the e-mail client application, the computer-readable memory used to direct a computer of the e-mail client application to perform the steps of:
   in response to a user activation of the e-mail client application, loading a phishing detection application with the activation of the e-mail client application, the phishing detection application comprising a plugin to the e-mail client application;
   the phishing detection application initiating an analysis engine that is part of the phishing detection application and which comprises a plurality of threads, wherein each thread is configured to analyze, only within the e-mail client application, an e-mail according to one of a plurality of phishing indicators;
   upon a user selection of an e-mail from one or more e-mails displayed in the e-mail client application, analyzing the selected e-mail by the analysis engine by running each of the plurality of threads on the selected e-mail only within the e-mail client application; and
   presenting a result summary of the analysis engine in a panel of the e-mail client application.

7. The computer-readable memory of claim 6, wherein the plurality of phishing indicators comprises:
   an IP location of a sender of the e-mail;
   a domain of the sender;
   a registration date of the domain;
   a reputation history of the sender;
   one or more keywords contained in the e-mail;
   a URL shortener;
   a URL redirection;
   a DKIM header mismatch;
   an attachment with embedded malware;
   a password protected attachment;
   a heavily obfuscated java script in a URL; and
   a reply to path disparity.

8. The computer-readable memory of claim of claim 7, further comprising:
   presenting a graphical representation of a phishing meter within the panel, the phishing meter displaying a percentage indication of the likelihood that the selected e-mail is a phishing e-mail based on the detection of one or more phishing indicators.

9. The computer-readable memory of claim 8, further comprising:
   presenting a textual description of one or more detected phishing indicators contained within the selected e-mail.

10. The method of claim 9, further comprising:
    updating the analysis engine according to data received via a threat intelligence feed.

11. A computerized system for detecting a phishing attempt presented by an e-mail displayed in an e-mail client application, the system comprising:
    a computer having a user interface; and
    a program product comprising machine-readable program code for causing, when executed, the computer to perform the following process steps:
       loading a phishing detection application upon activation of the e-mail client application, the phishing detection application comprising a plugin to the e-mail client application;
       initiating an analysis engine that is part of the phishing detection application and which comprises a plurality of threads, wherein each thread is configured to analyze an e-mail, only within the e-mail client application, according to one of a plurality of phishing indicators;
       analyzing a user selected e-mail from one or more e-mails displayed in the e-mail client application by running each of the plurality of threads on the user selected e-mail only within the e-mail client application; and
       presenting a result summary of the analysis engine in a panel of the e-mail client application.

12. The system of claim 11, wherein the plurality of phishing indicators comprises:
    an IP location of a sender of the e-mail;
    a domain of the sender;
    a registration date of the domain;

a reputation history of the sender;
one or more keywords contained in the e-mail;
a URL shortener;
a URL redirection;
a DKIM header mismatch;
an attachment with embedded malware;
a password protected attachment;
a heavily obfuscated java script in a URL; and
a reply to path disparity.

13. The system of claim of claim 12, further comprising: presenting a graphical representation of a phishing meter within the panel, the phishing meter displaying a percentage indication of the likelihood that the selected e-mail is a phishing e-mail based on one or more detected phishing indicators contained within the selected e-mail.

14. The system of claim 13, further comprising: presenting a textual description of one or more detected phishing indicators contained within the selected e-mail.

* * * * *